Patented Apr. 29, 1930

1,756,251

UNITED STATES PATENT OFFICE

BORIS N. LOUGOVOY, OF MONTCLAIR, NEW JERSEY, ASSIGNOR TO ELLIS-FOSTER COMPANY, A CORPORATION OF NEW JERSEY

PHTHALIC-UREA RESIN AND PROCESS OF MAKING SAME

No Drawing. Application filed January 28, 1924. Serial No. 689,187.

This invention relates to a composite amorphous product which may be denominated a resin derived by reaction between an organic acid such as phthalic acid or phthalic anhydride with urea or its derivatives and formaldehyde or equivalent substance.

When urea, phthalic anhydride and aqueous formaldehyde are mixed and heated in an open flask a milky liquid at first appears but on continued heating, preferably by boiling, the solution gradually clarifies and a thin transparent syrup is formed which on cooling becomes heavy bodied. Fifteen minutes to one hour boiling usually suffices to bring about this conversion. The heavy bodied syrup thus obtained will on long standing sometimes, for example in a few days time, show some separation of a whitish solid substance.

The syrup obtained in this way has the curious property of being soluble in or miscible with organic solvents such as methyl or ethyl alcohol or better with a ketone such as acetone. This solubility or miscibility has certain limits as too great an addition of for example acetone will give a white precipitate. Also if diluted with water a white precipitate will form in some cases when a certain dilution is reached.

For ordinary purposes the syrup may be diluted with an equal volume of acetone. This provides a solution which may be used as a varnish or impregnating medium. A coating of this material slowly hardens on exposure to air and much quicker on baking. Thus the solution may be applied to metal surfaces and the articles baked in order to produce a hard transparent coating.

When urea and formaldehyde are caused to react without an acid as for example by simple heating together a product is obtained which is very quickly discolored at high temperatures. The same is true when urea and formaldehyde are caused to react in the presence of a base, such as an alkali or hexamethylenetetramine. Such products seem to be rather sensitive to heat at temperatures above 100° C. and tend to turn yellow or brown. In attempting to mold such products discoloration is likely to occur. With the present product a marked resistance to discoloration by heating is noted. This is important in making white articles which retain their color on baking or molding in a hot press.

(A) A preferred mixture is made by boiling together 15 parts of urea, 15 parts of phthalic anhydride and 60 parts of ordinary aqueous formaldehyde of 37 to 40 per cent strength. The mixture may be boiled in an open flask for 12 to 15 minutes or longer if necessary to bring about clarification. The use of a reflux condenser is not always desirable because it may tend to cause the syrup to deposit a heavier precipitate of white material on standing. However suitable arrangements may be made such as an ordinary condenser (not refluxing) to collect any distillate and recover formaldehyde. In some cases the heating may be carried out in an autoclave under pressures above atmospheric.

(B) Another mixture is made by heating 50 parts each of urea and phthalic anhydride and 150 parts of aqueous formaldehyde. This product is not as readily miscible with acetone.

(C) Another product was obtained by heating 10 parts of urea, 20 parts of phthalic anhydride and 60 parts of aqueous formaldehyde. This product is somewhat more miscible with acetone than in the case of (B) and has slightly better keeping qualities.

(D) 20 parts of urea, 10 parts of phthalic anhydride and 60 parts of aqueous formaldehyde were mixed and boiled with the object of producing a clear solution but only a milky syrup could be obtained. This product was less readily incorporated with acetone.

(E) 20 parts urea, 50 parts phthalic anhydride and 50 parts aqueous formaldehyde were boiled together. When hot a pasty white product resulted which thickened somewhat on cooling.

A thick layer of syrup (A) was dried at 50° C. until the material could be removed from the drying pan and cut into various shapes such as strips, cubes and the like. These articles when air dried for 3 or 4 weeks were found to be clear and glass-like. I propose to use sheets of material made in this way or by longer baking if desired as substitutes for window glass in making wind shields and ground to form lenses for eye glasses or optical instruments. Sheets of the material also may be used in making goggles. Longer baking, especially with gradually increasing temperature, keeping at all times below the temperature at which bubbles or fissures due to expansion of moisture or gases form yields products more resistant to water, solvents and the like.

Thus for making transparent articles adapted as substitutes for those various uses for which glass is now employed I prefer slow drying or baking to bring about the conversion to a heat-resistant insoluble product. On the other hand the product is very sensitive to higher temperatures when in the initial syrupy or soluble form and may be very quickly transformed into an infusible product by heating to 110–130° C. without discoloration. This enables various molding compositions and molded articles to be obtained as will be subsequently described.

Clear glass-like material also has been obtained by vacuum drying up to a temperature of 90° C. An infusible product may be obtained in this manner.

Aqueous solutions generally tend to thicken and set to a solid pasty mass in the course of time. When thinned with acetone however the solutions show a much greater permanency which is desirable for many applications.

Acetone will mix in the cold with a syrup such as is obtained according to example (A). Alcohol however does not mix as well and it is better to add this solvent to the freshly prepared warm syrup. In this way a solution is obtained which on cooling does not show separation at least for some time.

The phthalic-urea complex made in this way when not baked or exposed to any high degree of heat is soluble in furfural. It is also soluble in phenol. The latter will dissolve even the baked material in many cases. A solution of the well dried resinous complex may be dissolved in furfural and a solution of nitrocellulose and acetone admixed with it to give a clear product.

Various tests were made with the syrupy material such as described in example (A) as a binder for the customary fillers employed in the plastic molding art with the object of producing molded articles which were heat resistant. Thus 50 parts by weight of syrup (A) were mixed with 100 parts of asbestos fibre and dried in a vacuum to 90° C., then ground and pressed for 10 minutes in a hydraulic press at 110° C. An infusible heat-resistant molded article was obtained having a good glossy surface, slightly gray in color due to the asbestos employed.

In another case equal parts of syrup (A) and wood flour were well mixed and dried in a vacuum dryer up to 75° C. When placed in the hot press and molded at 110° C. the molded article was found to be unsatisfactory because of what is termed overcuring. Another mixture in the same proportions was dried up to 50° C. in a vacuum dryer until the moisture was removed and then ground. Finally it was air-dried for 4 hours. On pressing in a hydraulic press at 110° C. for 10 minutes, pressure of 3000 pounds a light yellow translucent hard tough molded article was obtained.

No mold lubricant was required, the molded article leaving the hot mold freely without sticking. A temperature of 110° C. is a relatively low one for molding purposes and was used in the present case in order to give as favorable results as possible in regard to light color. The temperature of molding may however be increased with consequent increase in speed of setting or curing in the mold to produce an infusible article which may be taken from the mold without necessity of cooling.

A number of tests on the urea-phthalic compound show the phthalic acid or anhydride combines to a very large extent in the complex so that free phthalic acid or anhydride is not present especially when the composition is made up according to certain proportions such for example as specified in (A). In the latter case tests of the partially dried and also the heat-set material showed phthalic acid absent when carrying out the test according to the procedure given by Mullikan. Higher proportions of phthalic anhydride for example that given in example (E) which was not a particularly satisfactory product showed a considerable amount of phthalic anhydride to be present.

Among the uses for the product of the present invention is in the varnish, lacquer, paint and enamel industry, as an impregnating material, for hat stiffening and as a cement. It may be used in substitution for glass for various purposes such as lenses, wind shields, revolving doors, etc. In making imitation gems, beads, cigarette and cigar holders, pipe stems, umbrella and cane handles, fountain pens, billiard balls, ash trays, phonograph records, camera parts, grinding wheels, gears, artificial amber, insulation, white or light colored molded articles, buttons, ink stands, ornamental articles, dishes, etc. It may be reinforced by the use of appropriate wire netting or by sheets of paper or cloth. Or articles may be built up of impregnated sheets of fibrous material pressed together in a hot press.

The material of the present invention may be mixed with other substances such as resins, nitrocellulose, or other cellulose esters or ethers, with shellac solutions, either aqueous or alkaline, and the like.

In place of urea I may use urea derivatives such as thiourea and substituted ureas having similar or equivalent properties. In place of formaldehyde I may use paraform or other equivalent substance or a mixture of formaldehyde with acetaldehyde or other aldehydes, etc.

In addition to phthalic anhydride or phthalic acid other organic acids both monobasic, dibasic and polybasic may be used, including acids of both aliphatic and aromatic series and the following illustrates the results obtained with a series of such acids.

In the following series the acid is used in the proportion of 1 part by weight to 1 part of urea and 4 parts of aqueous formaldehyde of 40 per cent strength. The data first indicates the results obtained on boiling the ingredients together for 5 minutes and also the setting or hardening effect produced by heating a portion of each of the samples under like conditions on a hot plate to determine the comparative rate of setting and make observations on any discoloration brought about by the action of heat.

(1) *Benzoic acid.*—White opaque syrupy liquid containing much crystalline material. Hardens readily on heating on hot plate. Fairly white product.

(2) *Citric acid.*—The mixture effervesces on heating giving a perfectly clear syrup. Rapidly hardens on heating on hot plate with slight yellowing.

(3) *Acetic anhydride.*—The reaction is exothermic and a clear white jelly is obtained. On heating on hot plate a snow white infusible glossy mass resulted.

(4) *Propionic acid.*—Very mild reaction. Solution white but not syrupy. Slight turbidity. On heating on the hot plate a transparent hard white mass is obtained.

(5) *Gallic acid.*—On heating the ingredients together a clear thick syrupy solution formed which on cooling became clouded and slightly yellowish. A hard glossy yellowish resin was obtained by heating on the hot plate.

(6) *Lactic acid.*—The solution is clear, water white and syrupy. On the hot plate the material hardens to a resin of yellowish cast.

(7) *Maleic acid.*—Yields a slightly yellow thin syrup free from sediment however when heated on the hot plate a spongy brownish mass is obtained which is rather weak.

(8) *Salicylic acid.*—A water white syrup with some white crystalline matter results. When this product is heated on the hot plate a tough snow white resin readily forms.

(9) *Tartaric acid.*—When the ingredients are heated together effervescence is observed and a clear solution not particularly syrupy results. Heating on the hot plate gives a fairly tough resin of a pure white color.

(10) *Acetyl salicylic acid.*—On heating the ingredients a very thick syrup formed which could be changed to a transparent jelly. This reacted very quickly on the hot plate to produce a clear transparent resin. The rate of hardening or curing is notably rapid.

(11) *Oxalic acid.*—With this acid a clear rather thin light colored syrup was obtained which on heating on the hot plate set to a hard mass.

(12) *Mucic acid.*—A white syrup with much white solid matter resulted on reacting the materials together. When exposed on the hot plate a white resin resulted which was considerably tougher than that obtained with maleic acid.

(13) *Tannic acid.*—A yellow solution was obtained passing through a syrupy stage to thin jelly which was yellowish brown and transparent. On heating a dark brown resin resulted. The time of curing on the hot plate was fairly brief.

(14) *Trichloracetic acid.*—The reaction in this case was vigorous and in 3 minutes time a jelly was produced. On standing the jelly became opaque but along the walls of the vessel films of the material were flexible and transparent. The reaction takes place without the formation of bubbles and this acid is suggested for use in connection with the manufacture of sheets resembling glass and similar products. On the hot plate a white resin resulted which appeared to have considerable elasticity.

(15) *Stearic acid.*—The reaction in this case is poor and much separation occurs. The product obtained on the hot plate is opaque, but appears to be lacking in strength.

By the term acid agent of resinification as used in the claims, is meant an acid agent in the presence of which urea and formaldehyde react to form resins.

What I claim is:—

1. A resinous material comprising the reaction products of urea, phthalic anhydride and formaldehyde.

2. A resinous material comprising the resinous reaction products of urea, a dibasic aromatic acid anhydride and formaldehyde.

3. The process of making a resinous material which comprises reacting on urea with phthalic anhydride and formaldehyde.

4. The process which comprises reacting on urea with a dibasic aromatic acid and formaldehyde under resinifying conditions.

5. A material obtained by drying the reaction product from urea, formaldehyde, and a dibasic aromatic acid agent of resinification.

6. A process which comprises reacting together urea, formaldehyde and phthalic anhydride, and then drying the reaction product.

7. A process which comprises reacting together urea, formaldehyde and a dibasic aromatic acid, and then drying the reaction product in a vacuum.

8. A heat resistant insoluble product obtained by baking the reaction product of urea, formaldehyde, and phthalic anhydride.

9. A process of producing a resinous material which comprises baking the reaction product of urea, formaldehyde, and a dibasic aromatic acid.

10. A resinous material obtained from urea, formaldehyde, and phthalic anhydride, which contains no free phthalic anhydride.

11. A sirupy reaction product of urea, an organic acid, and formaldehyde, said reaction product being convertible into a resinous, solid material.

12. A solution of the sirupy reaction product of urea, an organic acid, and formaldehyde, in an organic solvent.

13. A glass-like condensation product of a dried, urea-formaldehyde-organic acid reaction complex.

14. An infusible glass-like condensation product of formaldehyde, an organic acid, and a carbamid compound corresponding to the formula $NH_2CXNH_2$, in which X is an atom of the oxygen-sulphur group.

15. A heat-molded condensation product of formaldehyde, an organic acid, and urea.

16. A resinous condensation product from paraform, an organic acid agent of resinification, and a carbamid compound corresponding to the formula $NH_2CXNH_2$ in which X is an atom of the oxygen-sulphur group.

17. The process which comprises forming an initial reaction product of urea, formaldehyde, and an organic acid, and then subjecting such initial reaction product to further heating to render it less soluble and less fusible.

18. A resinous material comprising the reaction products of a dibasic carboxylic acid, an aldehyde, and a carbamid compound corresponding to the formula $NR_2CXNR_2$ in which X is an atom of the oxygen-sulphur group, which compound is capable of forming an amorphous condensation product with the aldehyde.

19. The process of producing a condensation product which comprises heating together a dibasic carboxylic acid, an aldehyde, and a carbamid compound corresponding to the formula $NR_2CXNR_2$ in which X is an atom of the oxygen-sulphur group, which compound is capable of forming an amorphous condensation product with the aldehyde.

20. A molded article of manufacture comprising the reaction products of urea, phthalic anhydride and formaldehyde.

21. A molded article of manufacture comprising the reaction products of a dibasic carboxylic acid, an aldehyde, and a carbamid compound corresponding to the formula $NR_2CXNR_2$ in which X is an atom of the oxygen-sulphur group, which compound is capable of forming an amorphous condensation product with the aldehyde.

22. A baked condensation product of a dibasic carboxylic acid, an aldehyde and a carbamid compound corresponding to the formula $NR_2CXNR_2$ in which X is an atom of the oxygen-sulphur group, which compound is capable of forming an amorphous condensation product with the aldehyde.

23. A baked condensation product of urea, phthalic anhydride and formaldehyde.

24. The process of producing a condensation product which comprises heating a dibasic carboxylic acid, an aldehyde, and a carbamid compound corresponding to the formula $NR_2CXNR_2$ in which X is an atom of the oxygen-sulphur group, which compound is capable of forming an amorphous condensation product with the aldehyde.

25. The process of making a resinous material which comprises heating urea, phthalic anhydride and formaldehyde, under pressure.

26. A baked, air-dried condensation product of urea, phthalic anhydride and formaldehyde.

27. The process of making a condensation product which comprises reacting on urea with phthalic anhydride and formaldehyde, and baking the reaction product at a temperature below that at which bubbles or fissures form in the product.

28. A fusible urea formaldehyde, dibasic organic acid condensation product transformable into a substantially infusible product by heating at temperatures of from 110 to 130° C.

29. A urea formaldehyde phthalic acid condensation product transformable into a hardened product without substantial discoloration by heating at 110 to 130° C.

30. A urea formaldehyde dibasic organic acid condensation product heat treated at 110 to 130° C.

31. The process which comprises preparing a urea formaldehyde dibasic organic acid condensation product, and then heating such product at a temperature from 110 to 130° C.

32. The process of preparing a condensation product of urea phthalic anhydride and formaldehyde, and then heating said product at temperatures of from 110 to 130° C.

33. A molding composition containing reaction products of urea, phthalic anhydride and formaldehyde, and a filler.

34. A molding composition containing a resinous reaction product of urea, a dibasic aromatic acid anhydride and formaldehyde, and a filler.

BORIS N. LOUGOVOY.

DISCLAIMER 1,756,251.—*Boris N. Lougovoy*, Montclair, N. J. PHTHALIC-UREA RESIN AND PROCESS OF MAKING SAME. Patent dated April 29, 1930. Disclaimer filed June 8, 1942, by the assignee, *Ellis-Foster Company;* the licensee, *Plaskon Company, Incorporated*, concurring and assenting.

Hereby enters this disclaimer to claim 12 of said patent.

[*Official Gazette June 30, 1942.*]